United States Patent
Kaur et al.

(10) Patent No.: US 10,689,465 B2
(45) Date of Patent: Jun. 23, 2020

(54) EXTERNAL DONOR FOR OLEFIN POLYMERIZATION

(71) Applicant: Indian Oil Corporation Limited, Mumbai (IN)

(72) Inventors: Sukhdeep Kaur, Faridabad (IN); Usharani Sahoo, Faridabad (IN); Gurmeet Singh, Faridabad (IN); Rashmi Rani, Faridabad (IN); Gurpreet Singh Kapur, Faridabad (IN); Shashikant, Faridabad (IN)

(73) Assignee: Indian Oil Corporation Limited, Mumbai (IN)

(*) Notice: Subject to any disclaimer, the term of this patent is extended or adjusted under 35 U.S.C. 154(b) by 0 days.

(21) Appl. No.: 15/915,266

(22) Filed: Mar. 8, 2018

(65) Prior Publication Data

US 2018/0362675 A1 Dec. 20, 2018

(30) Foreign Application Priority Data

Jun. 15, 2017 (IN) .............................. 201721020909

(51) Int. Cl.
| | |
|---|---|
| *C08F 10/06* | (2006.01) |
| *C08F 4/649* | (2006.01) |
| *C08F 210/06* | (2006.01) |
| *C08F 4/646* | (2006.01) |
| *C08F 210/16* | (2006.01) |

(52) U.S. Cl.
CPC ............ *C08F 10/06* (2013.01); *C08F 4/6465* (2013.01); *C08F 4/6494* (2013.01); *C08F 210/06* (2013.01); *C08F 210/16* (2013.01)

(58) Field of Classification Search
CPC ...................................................... C08F 10/06
See application file for complete search history.

(56) References Cited

U.S. PATENT DOCUMENTS

| | | | |
|---|---|---|---|
| 4,287,328 A | 9/1981 | Kikuta | |
| 4,918,037 A | 4/1990 | Seppanen | |
| 5,192,732 A * | 3/1993 | Duranel | C08F 10/06 502/125 |
| 6,228,957 B1 | 5/2001 | Ford et al. | |
| 6,271,321 B1 | 8/2001 | Ford et al. | |
| 6,399,837 B1 | 6/2002 | Wilson et al. | |
| 6,534,613 B2 | 3/2003 | Ford et al. | |
| 6,825,146 B2 * | 11/2004 | Kilty | C08F 10/06 502/104 |
| 7,381,779 B2 | 6/2008 | Campbell et al. | |
| 7,420,022 B2 | 9/2008 | Blackmon et al. | |
| 7,491,670 B2 | 2/2009 | Chen et al. | |
| 7,678,868 B2 | 3/2010 | Chen et al. | |
| 7,781,363 B2 | 8/2010 | Chen et al. | |
| 7,893,003 B2 * | 2/2011 | Chen | B01J 8/1809 502/116 |
| 7,989,383 B2 | 8/2011 | Chen et al. | |
| 8,536,290 B2 | 9/2013 | Chen et al. | |
| 8,993,692 B2 | 3/2015 | Jorgensen et al. | |
| 9,102,770 B2 | 8/2015 | De Smet et al. | |
| 9,382,342 B2 | 7/2016 | Chen et al. | |
| 9,382,343 B2 | 7/2016 | Chen et al. | |
| 9,434,796 B2 | 9/2016 | Chen et al. | |
| 2010/0168353 A1 * | 7/2010 | Sheard | C07C 37/14 526/191 |

FOREIGN PATENT DOCUMENTS

GB 1559194 A * 1/1980 ............. C08F 4/022

OTHER PUBLICATIONS

Redzic et al., "Heterogeneous Ziegler-Natta catalysts with various sizes of MgCl2 crystallites:synthesis and characterization," Iran Polym. J. (2016) 25:321-327, p. 321. (Year: 2016).*

* cited by examiner

*Primary Examiner* — Catherine S Branch

(74) *Attorney, Agent, or Firm* — Melissa M. Hayworth; E. Joseph Gess

(57) ABSTRACT

The present invention provides an external electron donor composition comprising essentially of monoether as activity limiting agent for polymerization of olefins along with alkoxy silane as selectivity controlling agent, wherein mole percentage of the alkoxy silane to monoether is from 1 to 100.

17 Claims, No Drawings

EXTERNAL DONOR FOR OLEFIN POLYMERIZATION

RELATED APPLICATION

The present application claims priority to Indian Application No. 201721020909 filed Jun. 15, 2017, the contents of which are incorporated herein by reference in their entirety.

FIELD OF THE INVENTION

The present invention describes the usage of monoether as activity limiting agent as well as selectivity control agent when used as an external electron donor composition comprising of alkoxy silane and monoether during polymerization of olefins. The external electron donor composition provides improved catalyst activity while maintaining the total soluble and melt flow properties of the polymer, and enhanced hydrogen response of the catalyst.

BACKGROUND OF THE INVENTION

The external electron donor in Ziegler-Natta polymerization act as stereoselective control agents (SCA) to control the amount of atactic or non-stereo regular polymer produced during the reaction. The external electron donor for olefin polymerization when added to the catalytic system as a part of co-catalyst retains the stereospecificity of the active sites, convert non-stereospecific sites to stereospecific sites, poisons the non-stereospecific sites and also controls the molecular weight distributions while retaining high performance with respect to catalytic activity. Alkoxy silanes are used extensively as external electron donor for olefin polymerizations for Ziegler-Natta catalysts containing phthalates and diethers as internal donors. These donors impart different polymer properties depending upon the number and type of alkoxy group present in the alkoxy silane. Mixed alkoxy silane donors are also reported to be used for preparing polymers having enhanced properties.

The concept of activity limiting agent (ALA) was introduced with the explanation of self extinguishing nature of catalyst composition to avoid fouling of the reactor due to softening of the polymer during elevated polymerization temperature. This specifically is very important in those polymerization conditions where high temperatures are involved specifically in gas phase. U.S. Pat. No. 7,989,383 cites that catalyst composition having ethyl benzoate as internal donor when are used for polymerization along with p-ethoxy ethylbenzoate (PEEB) have inherent property of self extinguishing. This patent describes a catalyst composition having procatalyst, cocatalyst, selectivity control agent (SCA) comprising one or more silicon containing compounds and an activity limiting agent (ALA) selected from the group consisting of distearyl 3,3-thiodipropionate, butanedioic acid polymer with 4-hydroxy-2,2,6,6-tetramethyl-1-piperidineethanol, bis(2,2,6,6,-tetramethyl-4-piperidyl)sebacate, pentaerythritol tetrakis[3-(3',5'-di-t-butyl-4'-hydroxyphenyl)propionate], and combinations thereof.

U.S. Pat. No. 7,381,779 describes mixture of two or more different selectivity control agents comprising aromatic monocarboxylic acids or substituted derivatives and alkoxysilane compounds.

U.S. Pat. No. 7,781,363 describes a selectivity control agent having at least one silicon containing compound containing at least one C1-10 alkoxy group bonded to a silicon atom, and activity limiting agent (ALA) compounds comprising one or more aliphatic or cycloaliphatic carboxylic acids; alkyl-, cycloalkyl- or alkyl(poly)(oxyalkyl)-(poly)ester derivatives thereof or inertly substituted derivatives.

U.S. Pat. No. 7,893,003 provides a Ziegler-Natta catalyst composition comprising a procatalyst, a cocatalyst and a mixed external electron donor comprising a first selectivity control agent, a second selectivity control agent, and an activity limiting agent. This catalyst composition produces a high-stiffness propylene-based polymer with a melt flow rate greater than about 50 g/10 min. The polymerization process occurs in a single reactor, utilizing standard hydrogen concentration with no visbreaking. SCA1 comprises dicyclopentyldimethoxysilane, SCA2 is selected from the group consisting of methylcyclohexyldiethoxysilane, di-isobutyldiethoxysilane, n-propyltriethoxysilane, tetraethoxysilane, di-n-butyl-dimethoxysilane, benzyltriethoxysilane, but-3-enyltriethoxysilane, 1-(triethoxysilyl)-2-pentene, (triethoxysilyl)cyclohexane, and combinations thereof or, 1-ethoxy-2-n-pentoxybenzene and ALA comprises of C1-4 alkyl ester of aliphatic C8-20 monocarboxylic acid and/or isopropyl myristate.

U.S. Pat. No. 7,678,868 describes the usage of a mixture of a selectivity control agent comprising one or more silicon containing compounds and an activity limiting agent selected from the group consisting of a C1-20 alkyl ester of an aliphatic C8-20 monocarboxylic acid, a C2-20 alkyl mono- or poly-carboxylate derivative of a C2-100 polyglycol, and combinations thereof for propylene ethylene copolymerization.

U.S. Pat. No. 7,491,670 describes selectivity control agent comprising of alkoxy silane and activity limiting agent (ALA) compounds comprising one or more aliphatic or cycloaliphatic carboxylic acids; alkyl-, cycloalkyl- or alkyl (poly)(oxyalkyl)-(poly)ester derivatives thereof or inertly substituted derivatives usage in particular molar ratios with respect to transition metal and equivalent ratio of SCA and ALA to be used. Also claimed is the usage in gas phase polymerization and the polymer formed is without an undesired odor.

U.S. Pat. No. 8,993,692 describes the self limiting agent selected from the group of aliphatic, cycloaliphatic, substituted cycloaliphatic or aromatic esters, anhydrides and amides such that the self limiting agent reduces polymerization rates to no greater than 40% of the polymerization rate in the absence of the self limiting agent at temperatures equal to or greater than 120° C. for ethylene polymerization.

The usage of monoethers as external donor is described in: U.S. Pat. No. 6,399,837, U.S. Pat. No. 7,420,022, U.S. Pat. No. 6,271,321, U.S. Pat. No. 4,287,328, U.S. Pat. No. 9,102,770, U.S. Pat. No. 6,534,613, U.S. Pat. No. 6,228,957, U.S. Pat. No. 4,918,037 but none of the prior art describes the ability of monoether as ALA.

The usage of diethers as ALA has been described in: U.S. Pat. No. 8,536,290, U.S. Pat. No. 9,382,342, U.S. Pat. No. 9,382,343, U.S. Pat. No. 9,434,796 with alkoxypropyl ester as an internal electron donor.

It is desirable of those catalyst compositions which act as activity limiting agent as well as selectivity control agent in the polymerization process where the polymerization runs smoothly without any fouling of the reactor while maintaining the total soluble and melt flow properties of the polymer, and enhanced hydrogen response of the catalyst.

SUMMARY OF THE INVENTION

Accordingly, the present invention provides the usage of monoether as activity limiting agent as well as selectivity control agent when used as an external electron donor composition comprising of alkoxy silane and monoether during polymerization of olefins.

Further object of the invention is to provide the method of polymerization of olefins using external electron donor composition comprising of alkoxy silane and monoether.

Accordingly, the present invention provides an external electron donor composition comprising essentially of monoether as activity limiting agent for polymerization of olefins along with alkoxy silane as selectivity controlling agent, wherein mole percentage of the alkoxy silane to monoether is from 1 to 100.

In an embodiment of the present invention, an external electron donor composition comprising of monoether as activity limiting agent for polymerization of olefins along with alkoxy silane as selectivity controlling agent, wherein mole percentage of the alkoxy silane to monoether is from 1 to 100.

In one embodiment of the present invention, an external electron donor composition consisting of monoether as activity limiting agent for polymerization of olefins along with alkoxy silane as selectivity controlling agent, wherein mole percentage of the alkoxy silane to monoether is from 1 to 100.

In another embodiment of the present invention, an external electron donor composition consisting essentially of monoether as activity limiting agent for polymerization of olefins along with alkoxy silane as selectivity controlling agent, wherein mole percentage of the alkoxy silane to monoether is from 1 to 100.

In an embodiment of the present invention, the alkoxy silane is selected from the group consisting of monoalkoxysilane, dialkoxysilane, trialkoxysilane, tetraalkoxysilane, aminosilane and mixtures thereof; wherein:

(a) the monoalkoxysilane is selected from the group consisting of trimethylmethoxysilane, trimethylethoxysilane, trimethylphenoxysilane, tricyclopentylmethoxysilane, tricyclopentenylmethoxysilane, tricyclopentadienylmethoxysilane, tricyclopentylethoxysilane, cyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane, and diindenylcyclopentylmethoxysilane;

(b) the dialkoxysilane, is selected from a group consisting of dimethyldimethoxysilane, dimethyldiethoxysilane diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, 2-norbornanemethyldimethoxysilane, dicyclopentyldimethoxysilane, bis(2-methylcyclopentyl)dimethoxysilane, bis(3-tertiary butylcyclopentyl) dimethoxysilane, bis(2,3-dimethylcyclopentyl) dimethoxysilane, bis(2,5-dimethylcyclopentyl) dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane ethylenebis-cyclopentyldimethoxysilane and indenylfluorenyldimethoxysilane;

(c) the trialkoxysilane is selected from the group consisting of ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, methyltriallyloxysilane, cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane;

(d) the tetraalkoxysilane is selected from the group consisting of ethyl silicate, butyl silicate and the likes;

(e) the aminosilane, is selected from the group consisting of aminopropyltriethoxysilane, n-(3-triethoxysilylpropyl) amine, bis [(3-triethoxysilyl)propyl]amine, aminopropyltrimethoxysilane, aminopropylmethyldiethoxysilane, and hexanediaminopropyltrimethoxysilane.

In another embodiment of the present invention, the monoether is selected from the group consisting of diethyl ether, di-n-propyl ether, diisopropyl ether, diisobutyl ether, methyl isobutyl ether, methyl tertiobutyl ether, ethyl-n-propyl ether, ethyl isopropyl ether, ethyl-n-butyl ether, ethyl tert-butyl ether, di-n-octyl ether, diphenyl ether, diisooctyl ether, ethyl vinyl ether, diallyl ether, butyl vinyl ether, ethyl 1-propenyl ether, allyl phenyl ether, benzyl methyl ether, isobutyl vinyl ether, n-butyl vinyl ether, tert-butyl ethyl ether, dihexyl ether, benzyl phenyl ether, 2-ethyl hexyl vinyl ether, 2-chloroethyl ether, 2-chloroethyl vinyl ether, di-n-decyl ether, 3-methyl diphenyl ether and mixtures thereof.

In another embodiment of the present invention, the mole percentage of the monoether is in the range of 30 to 50.

In yet another embodiment of the present invention, the external electron donor composition act as activity limiting agent at elevated temperature in the range of 85° C. to 130° C.

The present invention also provides a process of polymerization of olefins, said process comprising the step of contacting an olefin having C2 to C20 carbon atoms under a polymerizing condition with a catalyst system comprising the external electron donor composition.

In one embodiment of the present invention the catalyst system includes a catalyst, an organoaluminum compound and the external electron donor composition.

In another embodiment of the present invention, the catalyst comprises of magnesium moiety, titanium compound, and internal donor.

In yet another embodiment of the present invention, the magnesium moiety is in the form of magnesium dihalide which is magnesium dichloride having distorted crystal lattice as support or magnesium based precursor; wherein the magnesium based precursor is liquid in nature and is prepared by contacting magnesium source with organohalide and alcohol in presence of the solvent in a single step; or the magnesium based precursor is solid in nature and is prepared by first contacting the magnesium source with organohalide in presence of solvating agent as the first step and then followed by addition of alcohol.

In yet another embodiment of the present invention, the titanium compound is represented by $Ti(OR)_pX_{4-p}$, where Ti is titanium metal; X is a halogen atom; R is a hydrocarbon group and p is an integer having value equal or less than 4.

In yet another embodiment of the present invention, the organoaluminum compound is alkylaluminum and is selected from the group consisting of trialkylaluminum, trialkenylaluminum, dialkylaluminum halide, alkylaluminum sesquihalide, dialkylaluminum hydride, partially hydrogenated alkylaluminum, aluminoxane and mixtures thereof; wherein:

(a) trialkylaluminum is selected from the group consisting of triethylaluminum, triisopropylaluminum, triisobutylaluminum, tri-n-butylaluminum, tri-n-hexylaluminum, tri-n-octylaluminum;

(b) trialkenylaluminum is triisoprenyl aluminum;

(c) dialkylaluminum halide is selected from the group consisting of diethylaluminum chloride, dibutylaluminum chloride, diisobutylaluminum chloride and diethyl aluminum bromide;

(d) alkylaluminum sesquihalide is selected from the group consisting of ethylaluminum sesquichloride, butylaluminum sesquichloride and ethylaluminum sesquibromide;

(e) dialkylaluminum hydride is selected from the group consisting of diethylaluminum hydride and dibutylaluminum hydride;

(f) partially hydrogenated alkylaluminum is selected from the group consisting of ethylaluminum dihydride and propylaluminum dihydride; and (g) aluminoxane is selected from the group consisting of methylaluminoxane, isobutylaluminoxane, tetraethylaluminoxane and tetraisobutylaluminoxane; diethylaluminum ethoxide.

In one embodiment of the present invention, mole ratio of aluminum (from organoaluminum compound) to titanium metal (from catalyst) is from 5:1 to 500:1 or from 10:1 to 250:1 or from 25:1 to 100:1.

In another embodiment of the present invention, mole ratio of aluminum (from organoaluminum compound) to external donor is from 1:1 to 1:60 or from 1:1 to 1:40.

In yet another embodiment of the present invention, mole ratio of alkoxysilane to titanium metal is from 1:1 to 1:30 or from 1:1 to 1:20.

In another embodiment of the present invention, mole ratio of monoether to titanium metal is from 1:1 to 1:60 or from 1:1 to 1:40.

In still another embodiment of the present invention, the process is carried out at elevated temperature in the range of 85° C. to 130° C. and the monoether as present in the external electron donor composition act as an activity limiting agent and it reduces the polymerization activity of the catalyst without affecting the polymer proeperties like melt flow rate, total solubles, molecular weight distribution.

In yet another embodiment of the present invention, the monoether as present in the external electron donor composition have the capability of acting as activity limiting agent at elevated polymerization temperature in the range of 85° C. to 130° C. and the monoether as present in the external electron donor composition also act as excellent external donors during desirable/conventional polymerization temperature, when the external electron donor composition comprises 50 mole percentage monoether along with alkoxysilane.

DETAILED DESCRIPTION OF THE INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

The terms "comprises", "comprising", or any other variations thereof, are intended to cover a non-exclusive inclusion, such that one or more processes or composition/s or methods proceeded by "comprises . . . a" does not, without more constraints, preclude the existence of other processes, sub-processes, composition, sub-compositions, minor or major compositions or other elements or other structures or additional processes or compositions or additional elements or additional features or additional characteristics or additional attributes.

Definition

For the purposes of this invention, the following terms will have the meaning as specified therein:

"Activity limiting agent (ALA)" used herein are compounds such that the combination of SCA/ALA at temperature higher than polymerization temperature, reduces the polymerization activity of catalyst.

"Selectivity control agent (SCA)" used herein are compounds which controls the tacticity or stereoregularity of polymer backbone, thereby affecting the properties of polymer.

"Desirable/conventional polymerization temperature" used herein is the temperature at which polymerization is conducted, preferably for propylene 70° C.

"Elevated polymerization temperature" used herein is the temperature higher than the desirable polymerization temperature, for propylene it is normally from 80° C. or higher.

The present invention describes the usage of monoether as activity limiting agent as well as selectivity control agent when used as an external electron donor composition comprising of alkoxy silane and monoether during polymerization of olefins. The external electron donor composition provides improved catalyst activity while maintaining the total soluble and melt flow properties of the polymer, and enhanced hydrogen response of the catalyst.

In an embodiment, an external electron donor composition comprises of alkoxy silane and monoether.

In another embodiment, the alkoxy silane includes but are not limited to dialkoxysilanes, not limiting to dimethyldimethoxysilane, dimethyldiethoxysilane diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, 2-norbornanemethyldimethoxysilane, dicyclopentyldimethoxysilane, bis(2-methylcyclopentyl)dimethoxysilane, bis(3-tertiary butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane ethylenebis-cyclopentyldimethoxysilane and indenylfiuorenyldimethoxysilane; monoalkoxysilanes, not limiting to trimethylmethoxysilane, trimethylethoxysilane, trimethylphenoxysilane, tricyclopentylmethoxysilane, tricyclopentenylmethoxysilane, tricyclopentadienylmethoxysilane, tricyclopentylethoxysilane, cyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane, diindenylcyclopentylmethoxysilane and ethylenebis-cyclopentyldimethoxysilane; trialkoxysilanes: ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, methyltriallyloxysilane, cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; the tetraalkoxysilanes is selected from the group consisting of ethyl silicate, butyl silicate and the likes; aminosilanes, not limiting to aminopropyltriethoxysilane, n-(3-triethoxysilylpropyl)amine, bis[(3-triethoxysilyl)propyl]amine, aminopropyltrimethoxysilane, aminopropylmethyldiethoxysilane, hexanediaminopropyltrimethoxysilane. Mixtures of alkoxy silane can also be used.

In another embodiment, monoethers includes but are not limited to diethyl ether, di-n-propyl ether, diisopropyl ether, diisobutyl ether, methyl isobutyl ether, methyl tertisobutyl ether, ethyl-n-propyl ether, ethyl isopropyl ether, ethyl-n-butyl ether, ethyl tert-butyl ether, di-n-octyl ether, diphenyl ether, diisooctyl ether, ethyl vinyl ether, diallyl ether, butyl vinyl ether, ethyl 1-propenyl ether, allyl phenyl ether, benzyl methyl ether, isobutyl vinyl ether, n-butyl vinyl ether, tert-butyl ethyl ether, dihexyl ether, benzyl phenyl ether, 2-ethyl butyl vinyl ether, 2-chloroethyl ether, 2-chloroethyl vinyl ether, di-n-decyl ether, 3-methyl diphenyl ether. Mixtures of monoethers can also be used.

The external electron donor composition comprising of alkoxy silane and monoether wherein mole percentage of alkoxy silane to monoether is from about 1 to 100, It is desirable that those compositions are preferred where the polymerization runs smoothly without any fouling of the reactor.

In the present invention, the polymerization of olefins is carried out in the presence of the external electron donor composition. The catalyst system is contacted with olefin under polymerization conditions to produce desired polymer products. The polymerization process can be carried out such as by slurry polymerization using an inert hydrocarbon solvent as a diluent, or bulk polymerization using the liquid monomer as a reaction medium and in gas-phase operating in one or more fluidized or mechanically agitated bed reactors. In an embodiment, polymerization is carried out as such. In another embodiment, the copolymerization is carried out.

The catalyst system includes the catalyst, organoaluminum compounds and/or external electron donors. In particular, the catalyst comprises of magnesium moiety, titanium compound, and internal donor as desired. The magnesium moiety is in the form of magnesium dihalide which is preferably magnesium dichloride having distorted crystal lattice, as support or magnesium based precursor for Ziegler-Natta catalysts.

In the present invention, the catalyst contacted with olefin under polymerization conditions to produce desired polymer products is prepared by the process as described in WO2014/045260 and WO2014/045259.

The magnesium based precursor contains magnesium and may be liquid or solid in nature. For the magnesium based precursor being liquid in nature, it is prepared by contacting magnesium source with organohalide and alcohol in presence of the solvent in a single step. For the magnesium based precursor to be solid in nature, it is prepared by first contacting the magnesium source with organohalide in presence of solvating agent as the first step and then followed by addition of alcohol. The solid magnesium based precursor is obtained either by removal of solvating agent or by precipitation methodology.

The catalyst is prepared through the process which requires contacting magnesium moiety or magnesium based precursor with titanium compound. In an embodiment, the magnesium moiety or magnesium based precursor in the solvent is treated with titanium compound represented by $Ti(OR)_pX_{4-p}$, where Ti is titanium metal; X is a halogen atom; R is a hydrocarbon group and p is an integer having value equal or less than 4.

The co-catalyst may include hydrides, organoaluminum, lithium, zinc, tin, cadmium, beryllium, magnesium, and combinations thereof. In an embodiment, the preferred co-catalyst is organoaluminum compounds.

In an embodiment, the organoaluminum compounds include, not limiting to, alkylaluminums such as trialkylaluminum such as preferably triethylaluminum, triisopropylaluminum, triisobutylaluminum, tri-n-butylaluminum, tri-n- hexylaluminum, tri-n-octylaluminum; trialkenylaluminums such as triisoprenyl aluminum; dialkylaluminum halides such as diethylaluminum chloride, dibutylaluminum chloride, diisobutylaluminum chloride and diethyl aluminum bromide; alkylaluminum sesquihalides such as ethylaluminum sesquichloride, butylaluminum sesquichloride and ethylaluminum sesquibromide; dialkylaluminum hydrides such as diethylaluminum hydride and dibutylaluminum hydride; partially hydrogenated alkylaluminum such as ethylaluminum dihydride and propylaluminum dihydride and aluminoxane such as methylaluminoxane, isobutylaluminoxane, tetraethylaluminoxane and tetraisobutylaluminoxane; diethylaluminum ethoxide.

The mole ratio of aluminum (from cocatalyst) to titanium (from catalyst) is from about 5:1 to about 500:1. In an embodiment, the mole ratio of aluminum to titanium is from about 10:1 to about 250:1 preferably, from about 25:1 to about 100:1.

The mole ratio of aluminum (from cocatalyst) to external donor is from about 1:1 to about 1:60. In an embodiment, the mole ratio of aluminum to external donor is from about 1:1 to about 1:40.

The mole ratio of alkoxysilane to titanium metal is from about 1:1 to about 1:30. In an embodiment, the mole ratio of alkoxysilane to transition metal is from about 1:1 to about 1:20.

The mole ratio of monoether to titanium metal is from about 1:1 to about 1:60. In an embodiment, the mole ratio of monoether to titanium metal is from about 1:1 to about 1:40.

The purpose of adding activity limiting agent is that it reduces the polymerization activity of the catalyst at elevated temperatures. In an embodiment, the elevated temperatures are from 85° to 130° C., preferably from 100 to 120° C. The advantage also includes the activity limiting agent does not effects the polymer proeperties like melt flow rate, total solubles, molecular weight distribution.

The inventors have surprisingly found that the monoethers not only have the capability of acting as activity limiting agent at elevated polymerization temperatures but also during desirable polymerization temperature, act as excellent external donors when added in 50 mol % along with alkoxysilanes. The catalyst activity is maintained and so as the soluble and melt flow properties of the polymer.

Example

Having described the basic aspects of the present invention, the following non-limiting example illustrate specific embodiment thereof.

To 60 ml of TiCl$_4$ solution maintained at desired temperature, 100 ml of the organomagnesium precursor (prepared accordingly to WO2014/045260 and WO2014/045259) along with internal donor was added over a period of 10 min and stirred. After the system has attained the desired temperature, the resultant solution was maintained at the same temperature for 15 min. The resultant solution was clear orange in color. Gradually the reaction temperature was increased to 110° C. and maintained for 1 h. After settling and decantation, the suspended solid was again treated with 60 ml TiCl$_4$ and 60 ml chlorobenzene and after temperature reached 110° C., the mixture was maintained under stirring for 15 minutes. The above step was again repeated. After the reaction was finished, the solid was decanted and washed sufficiently with hexane at 70° C., respectively and further dried under hot nitrogen till freely flowing.

For external donor preparations, at fixed Al/Do mol ratios, the required amount of alkoxysilane and monoether were added and stirred for one hour to ensure complete miscibility.

Propylene polymerization was carried out in 1 L buchi reactor which was previously conditioned under nitrogen. The reactor was charged with 250 ml of dry hexane containing solution of 10 wt % triethylaluminum followed by 100 ml of dry hexane containing 10 wt % solution of triethylaluminum, 5 wt % solution of external donor and weighed amount of catalyst. The reactor was pressurized with hydrogen to 60 ml then charged with 71 psi of propylene under stirring at 750 rpm. The reactor was heated to and then held at 70° C. for 2 hour. At the end, the reactor was vented and the polymer was recovered at ambient conditions.

For copolymerization of ethylene and propylene, ethylene was charged after 2-3 bar of propylene pressure in reactor for addition of both ethylene and propylene simultaneously. The flow rate of ethylene was 1 L/min.

Molecular weight analysis was measured on Malvern HT-GPC at 150° C. in 1,2,4-trichlorobenzene using PL Gel Olexis column and Conventional Calibration.

NMR measurements were recorded on an Agilent 500 MHz DD2 NMR spectrometer equipped with a 10 mm dual probe at 130±0.1° C. in 1,1,2,2-tetrachloroethane-d2/ortho-dichlorobenzene (TCE-d2/ODCB) (w:w, 1:1) solvent.

Abbreviations Used in the Present Invention

Al=Aluminum
Do=External Donor
Ti=titanium
DBE=dibutyl ether
DPE=diphenyl ether
DBzE=dibenzyl ether
BuPE=butyl phenyl ether
C-donor=cyclohexylmethyldimethoxysilane
D-donor=dicyclopentyldimethoxysilane
NPTMS=n-propyltrimethoxysilane
DPDMS=diphenyldimethoxysilane
MFI=melt flow index
II=isotacticity index (from NMR)
PDI=polydispersity index Productivity Ratio is defined as $P_T/P_{70}$ i.e., ratio of productivity of the catalyst for polymerizing propylene at polymerization temperature T and productivity of the catalyst for polymerizing propylene at polymerization temperature of 70° C.

Productivity ratio for external donor composition of cyclohexyl methyl dimethoxy silane (C-donor) and different monoethers as external donor at Al/Ti mole ratio of 500 are shown in Table 1. All the polymerizations were conducted for 2 h.

TABLE 1

| S No. | Ext Donor silane/ monoether | Silane/ monoether (mol %) | Temp (° C.) | Productivity (kg/g cat) | Productivity Ratio $P_T/P_{70}$ |
|---|---|---|---|---|---|
| PP#1134 | C-donor/ | 100/0 | 70 | 7.4 | 1 |
| PP#1170 | DBE | | 90 | 2.1 | 0.32 |
| PP#1135 | | 90/10 | 70 | 7.4 | — |
| PP#1136 | | 80/20 | 70 | 7.5 | — |
| PP#1137 | | 70/30 | 70 | 8.2 | — |
| PP#1138 | | 50/50 | 70 | 8.2 | 1 |
| PP#1168 | | | 90 | 2.8 | 0.34 |

TABLE 1-continued

| S No. | Ext Donor silane/ monoether | Silane/ monoether (mol %) | Temp (° C.) | Productivity (kg/g cat) | Productivity Ratio $P_T/P_{70}$ |
|---|---|---|---|---|---|
| PP#1169 | | | 100 | 2.1 | 0.27 |
| PP#1139 | | 30/70 | 70 | 7.3 | — |
| PP#1141 | | 20/80 | 70 | 7.4 | — |
| PP#1142 | | 10/90 | 70 | 7.3 | — |
| PP#1143 | | 0/100 | 70 | 4.3 | 1 |
| PP#1171 | | | 100 | 1.5 | 0.34 |
| PP#1184 | C-donor/ | 0/100 | 70 | 4.2 | 1 |
| PP#1201 | DPE | | 100 | 1.6 | 0.38 |
| PP#1179 | | 50/50 | 70 | 7.5 | 1 |
| PP#1181 | | | 90 | 3.6 | 0.48 |
| PP#1186 | C-donor/ | 0/100 | 70 | 4.7 | 1 |
| PP#1185 | BuPE | | 100 | 2.1 | 0.45 |
| PP#1187 | | 50/50 | 70 | 7.1 | 1 |
| PP#1188 | | | 90 | 4.2 | 0.59 |
| PP#1193 | C-donor/ | 0/100 | 70 | 4.5 | 1 |
| PP#1195 | DBzE | | 90 | 1.9 | 0.42 |
| PP#1190 | | 50/50 | 70 | 8.2 | 1 |
| PP#1191 | | | 90 | 3.9 | 0.47 |

Productivity ratio for external donor composition of different silanes and different monoethers as external donor at Al/Ti mole ratio of 500 are shown in Table 2. All the polymerizations were conducted for 2 h.

TABLE 2

| S No. | Ext Donor silane/ monoether | Silane/ monoether (mol %) | Temp (° C.) | Productivity (kg/g cat) | Productivity Ratio $P_T/P_{70}$ |
|---|---|---|---|---|---|
| PP#1154 | D-donor/ | 100/0 | 70 | 9.0 | 1 |
| PP#1194 | DBE | | 100 | 4.9 | 0.54 |
| PP#1151 | | 50/50 | 70 | 9.1 | 1 |
| PP#1172 | | | 90 | 6.2 | 0.68 |
| PP#1174 | | | 100 | 2.1 | 0.23 |
| PP#1155 | DPDMS/ | 100/0 | 70 | 6.4 | — |
| PP#1162 | DBE | 50/50 | 70 | 6.7 | 1 |
| PP#1160 | | | 90 | 3.2 | 0.48 |
| PP#1164 | NPTMS/ | 100/0 | 70 | 4.5 | 1 |
| PP#1601 | DBE | | 100 | 1.3 | 0.29 |
| PP#1165 | | 50/50 | 70 | 5.4 | 1 |
| PP#1173 | | | 90 | 2.0 | 0.37 |
| PP#1200 | D-donor/ | 50/50 | 70 | 8.5 | 1 |
| PP#1199 | DPE | | 90 | 3.6 | 0.42 |
| PP#1202 | D-donor/ | 50/50 | 70 | 8.6 | 1 |
| PP#1206 | BuPE | | 90 | 4.4 | 0.51 |
| PP#1193 | D-donor/ | 50/50 | 70 | 9.2 | 1 |
| PP#1205 | DBzE | | 90 | 4.6 | 0.5 |

Table 1 and Table 2 show that by using external donor compositions containing monoether as ALA according to the invention, reduced polymerization activity may be obtained at elevated polymerization temperatures as compared to the alkoxysilane used as alone. These compositions show self-limiting polymerization properties. Accordingly, use of such external donor compositions can reduce or avoid uncontrolled polymerization reaction, as well as softening or melting of polymer that leads to agglomerate formation and sheeting or fouling of the reactor. The reduction in the catalyst activity can also be controlled by the adjustment of the external donor compositions i.e., by adjusting the mole ratios of the alkoxysilanes and monoethers.

Analysis of the resulting polymers produced from those illustrated compositions demonstrated that the polymers retain tacticity and molecular weight distribution properties.

Table 3 is one of the illustrations for the above statement where polymer properties obtained using DBE as ALA has been tabulated.

TABLE 3

| S No. | Silane/ Monoether | Monoether (mol %) | Polym Temp (° C.) | PDI | II (%, NMR) |
|---|---|---|---|---|---|
| PP#1138 | C-donor/DBE | 50 | 70 | 5.8 | 90.1 |
| PP#1168 | | | 90 | 5.4 | 90.1 |
| PP#1151 | D-donor/DBE | 50 | 70 | 5.3 | 93.1 |
| PP#1172 | | | 90 | 5.2 | 93.2 |
| PP#1162 | DPDMS/DBE | 50 | 70 | 6.4 | 90.1 |
| PP#1160 | | | 90 | 6.2 | 90.4 |
| PP#1165 | NPTMS/DBE | 50 | 70 | 5.9 | 82.3 |
| PP#1173 | | | 90 | 5.7 | 82.5 |

To ensure that monoether at 50 mol % is acting as external donor and to rule out the possibility that alkoxysilane is dominating the polymerization, polymerization run was conducted at Al/Do mol ratio of 60 with neat alkoxysilane as shown in Table 4. As expected, decreasing the amount of alkoxysilane reduced the catalyst activity.

TABLE 4

| S No. | Al/Do (mol) | Silane | DBE (mol %) | Productivity (kg/g cat) |
|---|---|---|---|---|
| PP#1153 | 60 | C-donor | 0 | 8.0 |
| PP#1159 | 60 | D-donor | 0 | 6.1 |
| PP#1166 | 60 | NPTMS | 0 | 5.1 |

Ethylene propylene copolymerization conducted at Al/Ti mol ratio of 500, Al/Do mol ratio of 30 at 80° C. is tabulated in Table 5.

TABLE 5

| S No. | C2 | C3 | Ext Donor silane/ monoether | Silane/ monoether (mol %) | Temp (° C.) | Productivity (kg/g cat) |
|---|---|---|---|---|---|---|
| PP#1222 | 1 L@ 1 L/min | 47 L@ 3 L/min | C-donor/ DBE | 50/50 | 80 | 5.3 |
| PP#1224 | 1 L@ 1 L/min | 26 L@ 3 L/min | | | 90 | 2.6 |

Table 5 clearly shows that for copolymerization also, DBE works as activity limiting agent at higher polymerization temperatures.

The invention claimed is:

1. A process of polymerization of olefins, said process comprising the step of contacting an olefin having C2 to C20 carbon atoms under a polymerizing condition with a catalyst system comprising an external electron donor composition consisting essentially of a dibutyl ether as activity limiting agent in the range of 30 to 50 mole percent along with an alkoxy silane as selectivity controlling agent,
    wherein the polymerization process is carried out at a temperature of around 70° C., and when the temperature during polymerization process elevates to 85° C. to 130° C., the dibutyl ether present in the external electron donor composition acts as an activity limiting agent and reduces the polymerization activity of the catalyst without affecting the polymer properties.

2. The polymerization process as claimed in claim 1, wherein the catalyst system includes a catalyst, an organoaluminum compound and the external electron donor composition consisting essentially of a dibutyl ether as activity limiting agent in the range of 30 to 50 mole percent along with an alkoxy silane as selectivity controlling agent.

3. The polymerization process as claimed in claim 2, wherein the catalyst comprises a magnesium moiety, a titanium compound, and an internal donor.

4. The polymerization process as claimed in claim 3, wherein the magnesium moiety is in the form of magnesium dihalide which is magnesium dichloride having distorted crystal lattice as support or magnesium based precursor;

wherein the magnesium based precursor is liquid in nature and is prepared by contacting magnesium source with organohalide and alcohol in presence of the solvent in a single step; or the magnesium based precursor is solid in nature and is prepared by first contacting the magnesium source with organohalide in presence of solvating agent as the first step and then followed by addition of alcohol.

5. The polymerization process as claimed in claim 3, wherein the titanium compound is represented by Ti(OR)$_p$X$_{4-p}$, where Ti is titanium metal; X is a halogen atom; R is a hydrocarbon group and p is an integer having value equal or less than 4.

6. The polymerization process as claimed in claim 2, wherein the organoaluminum compound is alkylaluminum selected from the group consisting of trialkylaluminum, trialkenylaluminum, dialkylaluminum halide, alkylaluminum sesquihalide, dialkylaluminum hydride, partially hydrogenated alkylaluminum, aluminoxane and mixtures thereof; wherein:
(a) trialkylaluminum is selected from the group consisting of triethylaluminum, triisopropylaluminum, triisobutylaluminum, tri-n-butylaluminum, tri-n-hexylaluminum, tri-n-octylaluminum;
(b) trialkenylaluminum is triisoprenyl aluminum;
(c) dialkylaluminum halide is selected from the group consisting of diethylaluminum chloride, dibutylaluminum chloride, diisobutylaluminum chloride and diethyl aluminum bromide;
(d) alkylaluminum sesquihalide is selected from the group consisting of ethylaluminum sesquichloride, butylaluminum sesquichloride and ethylaluminum sesquibromide;
(e) dialkylaluminum hydride is selected from the group consisting of diethylaluminum hydride and dibutylaluminum hydride;
(f) partially hydrogenated alkylaluminum is selected from the group consisting of ethylaluminum dihydride and propylaluminum dihydride and
(g) aluminoxane is selected from the group consisting of methylaluminoxane, isobutylaluminoxane, tetraethylaluminoxane and tetraisobutylaluminoxane; diethylaluminum ethoxide.

7. The polymerization process as claimed in claim 2, wherein mole ratio of aluminum (from organoaluminum compound) to titanium metal (from catalyst) is from 5:1 to 500:1.

8. The polymerization process as claimed in claim 2, wherein mole ratio of aluminum (from organoaluminum compound) to external donor composition is from 1:1 to 1:60.

9. The polymerization process as claimed in claim 2, wherein mole ratio of alkoxysilane to titanium metal is from 1:1 to 1:30 and mole ratio of dibutyl ether to titanium metal is from 1:1 to 1:60.

10. The polymerization process as claimed in claim 1, wherein the dibutyl ether as present in the external electron donor composition has the capability of acting as activity limiting agent at elevated polymerization temperature in the range of 85° C. to 130° C. and the dibutyl ether as present in the external electron donor composition also acts as excellent external donors during desirable/conventional polymerization temperature of 70° C., when the external electron donor composition comprises 50 mole percentage dibutyl ether along with alkoxysilanes.

11. The polymerization process as claimed in claim 7, wherein mole ratio of aluminum (from organoaluminum compound) to titanium metal (from catalyst) is from 10:1 to 250:1.

12. The polymerization process as claimed in claim 7, wherein mole ratio of aluminum (from organoaluminum compound) to titanium metal (from catalyst) is from 25:1 to 100:1.

13. The polymerization process as claimed in claim 8, wherein mole ratio of aluminum (from organoaluminum compound) to external donor composition is from 1:1 to 1:40.

14. The polymerization process as claimed in claim 9, wherein mole ratio of alkoxysilane to titanium metal is from 1:1 to 1:20 and mole ratio of dibutyl ether to titanium metal is from 1:1 to 1:40.

15. An external electron donor composition comprising essentially of dibutyl ether as activity limiting agent for polymerization of olefins along with alkoxy silane as selectivity controlling agent,
wherein mole percentage of the alkoxy silane to dibutyl ether is from 1 to 100.

16. The composition as claimed in claim 15, wherein the alkoxy silane is selected from the group consisting of monoalkoxysilanes, dialkoxysilanes, trialkoxysilanes, tetraalkoxysilane, aminosilanes and mixtures thereof; wherein:
(a) the monoalkoxysilanes is selected from the group consisting of trimethylmethoxysilane, trimethylethoxysilane, trimethylphenoxysilane, tricyclopentylmethoxysilane, tricyclopentenylmethoxysilane, tricyclopentadienylmethoxysilane, tricyclopentylethoxysilane, cyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane, and diindenylcyclopentylmethoxysilane;
(b) the dialkoxysilane is selected from a group consisting of dimethyldimethoxysilane, dimethyldiethoxysilane diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, 2-norbornanemethyldimethoxysilane, dicyclopentyldimethoxysilane, bis(2-methylcyclopentyl)dimethoxysilane, bis(3-tertiary butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4- cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane, ethylenebis-cyclopentyldimethoxysilane, and indenylfluorenyldimethoxysilane;

(c) the trialkoxysilane is selected from the group consisting of ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, methyltriallyloxysilane, cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane;

(d) the tetraalkoxysilane is selected from the group consisting of ethyl silicate, and butyl silicate;

(e) the aminosilane is selected from the group consisting of aminopropyltriethoxysilane, n-(3-triethoxysilylpropyl)amine, bis [(3-triethoxysilyl)propyl]amine, aminopropyltrimethoxysilane, aminopropylmethyldiethoxysilane, and hexanediaminopropyltrimethoxysilane.

17. The composition as claimed in claim 15, wherein the external electron donor composition act as activity limiting agent at elevated temperature in the range of 85° C. to 130° C.

* * * * *